United States Patent [19]

Abe

[11] 4,405,268
[45] Sep. 20, 1983

[54] TOOL HEAD

[75] Inventor: Hitoshi Abe, Utsunomiya, Japan

[73] Assignee: Kyoritsu Seiki Corporation, Tochigi, Japan

[21] Appl. No.: 220,979

[22] Filed: Dec. 29, 1980

[30] Foreign Application Priority Data

Dec. 29, 1979 [JP] Japan .......................... 54-181927[U]
Dec. 29, 1979 [JP] Japan .......................... 54-181928[U]

[51] Int. Cl.³ .......................................... B23B 29/03
[52] U.S. Cl. .................................... 408/182; 408/185
[58] Field of Search ............... 408/182, 181, 185, 153

[56] References Cited

U.S. PATENT DOCUMENTS

| | | | |
|---|---|---|---|
| 3,044,322 | 7/1962 | George | 408/181 |
| 3,700,346 | 10/1972 | Eckle | 408/185 |
| 4,101,239 | 7/1978 | Wohlhaupter | 408/182 |

FOREIGN PATENT DOCUMENTS

| | | | |
|---|---|---|---|
| 2813575 | 10/1978 | Fed. Rep. of Germany | 408/181 |
| 2290979 | 7/1976 | France | 408/181 |

*Primary Examiner*—Leonidas Vlachos
*Attorney, Agent, or Firm*—Armstrong, Nikaido, Marmelstein & Kubovcik

[57] ABSTRACT

A tool head comprising plural cutting insert holders disposed on a holder main frame fixed to an arbor in such a manner that each is capable of sliding in the radial direction of the arbor; adjusting screws disposed on the holder main frame in parallel to the cutting insert holders in such a manner that movement in both axial and radial directions is restricted; and female screws fixed to the cutting insert holders and brought into tight screw engagement with the adjusting screws, respectively.

4 Claims, 5 Drawing Figures

TOOL HEAD

BACKGROUND OF THE INVENTION (1) Field of the Invention

This invention relates to a tool head for use in machine tools. More particularly, the present invention relates to a tool head of an improved type for improving the locating accuracy of cutting insert holders.

(2) Description of the Prior Art

There has conventionally been known a tool head which is equipped with plural cutting insert holders and is capable of simultaneously adjusting the positions of these plural cutting insert holders by means of a single adjusting mechanism.

Screws are employed for the delivery of the above-mentioned cutting insert holders. Namely, the screws are rotated by a handle provided with calibration so that the cutting insert holders are fed by a pitch corresponding to the angle of rotation.

In the tool head of this kind, however, it has been difficult to furnish the feed screws for feeding the cutting insert holders with the same pitch. Consequently, variance of a moving distance occurs for each cutting insert holder fed in accordance with the angle of rotation of the handle. This phenomenon is not a critical problem during rough machining, but non-uniformity of the pitch of the feed screws exerts significant influences upon the machined surface during percision machining because adjustment of the cutting insert positions must be made on the order of microns in such a case. To solve this problem, accuracy of the feed screws may as well be improved, in principle. However, it is virtually not possible to realize the same pitch for a plurality of feed screws. On the other side, the attempt of improving the accuracy of the screw pitch in order to reduce the pitch error would result in the remarkable increase in the cost of production and hence, is not feasible in practice.

SUMMARY OF THE INVENTION

The present invention is therefore directed to provide a tool head which makes it possible to adjust the position not only of a single cutting insert holder but also a plurality of chip holders to desired position or positions in an easy and accurate manner.

The tool head to accomplish the abovementioned object of the present invention comprises an arbor having a groove defined on the end surface thereof; a holder main frame fitted into the groove; plural cutting insert holders radially fitted to the holder main frame in such a manner that each is capable of sliding; an adjusting screw fitted to the holder main frame in parallel to each of the cutting insert holders in such a manner as to restrict its movement in both axial and radial directions; and a female screw fitted to each of said cutting insert holders to tightly engage with each of said adjusting screws.

DETAILED DESCRIPTION OF THE PREFERRED EMBODIMENTS

Figure 1:
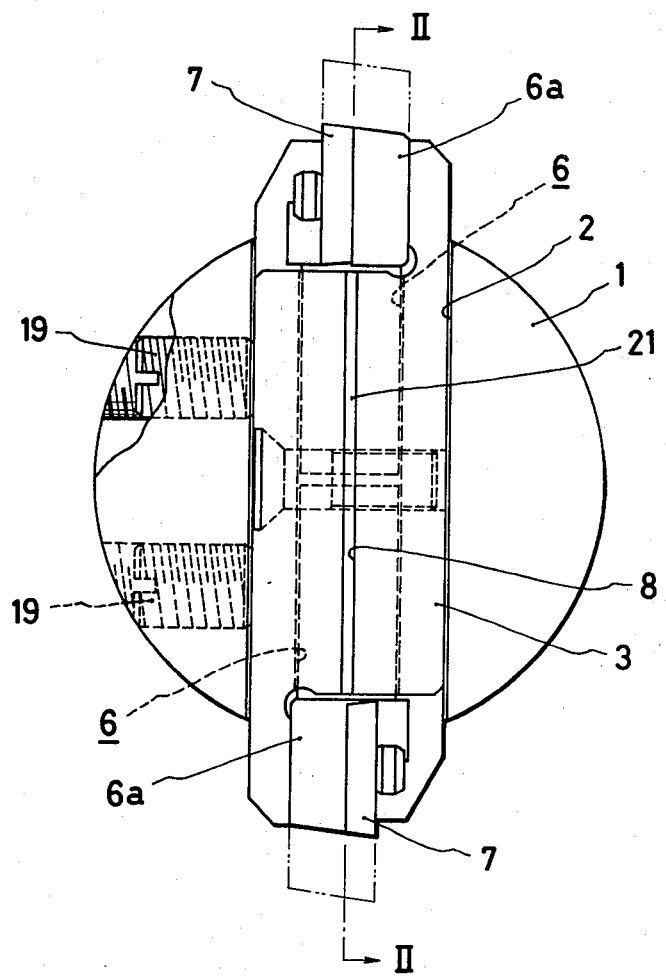
FIG. 1 is a front view of the tool head in accordance with the present invention.
Figure 2:
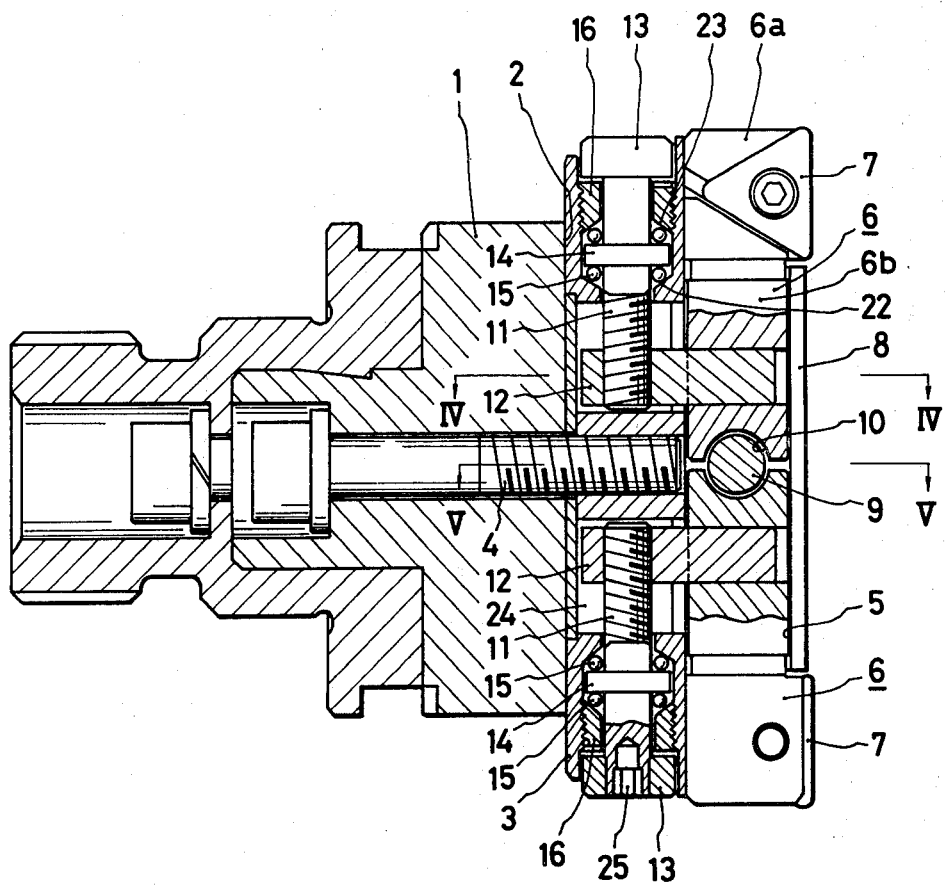
FIG. 2 is a sectional view taken along line II—II of FIG. 1.
Figure 3:
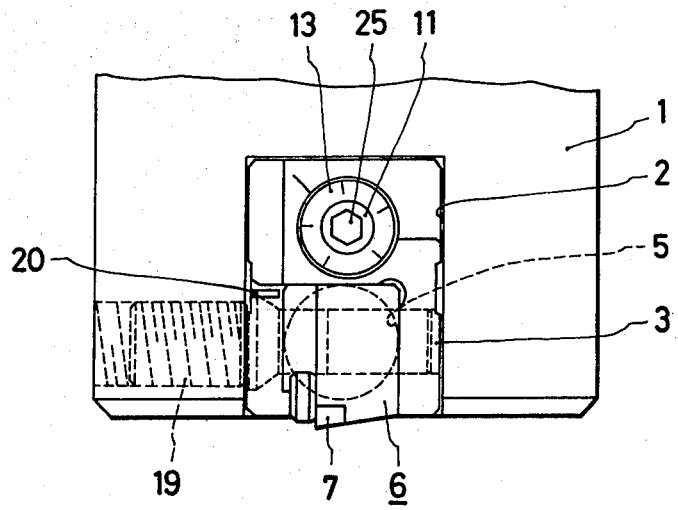
FIG. 3 is a side view of the tool head in accordance with the present invention.

In FIGS. 1 through 3, a groove 2 is shown formed on the end surface of an arbor 1 extending in the radial direction of the arbor 1. A rectangular holder main frame 3 is fitted to the groove 2, and is fixed to the arbor 1 by means of a set-bolt 4 as shown in FIG. 2.

As can be understood from FIGS. 1 through 5, a cylindrical cutting insert holder fitting hole 5 is bored on the holder main frame 3 in its longitudinal direction. Plural cutting insert holders 6, e.g., two holders 6, are fitted to the chip holder fitting hole 5 in a radial arrangement, that is, in a slidable arrangement in the radial direction of the arbor 1. Each cutting insert 6 consists of a head 6a and a piston-like body 6b. A cutting insert 7 is detachably fitted to the head 6a in such a manner as to work a workpiece.

On the end surface of the holder main frame 3, that is, on the surface of the main frame opposing the workpiece which is not shown, there is defined a split groove 8 extending over the entire surface of the main frame in its longitudinal direction and reaching the cutting insert holder fitting hole 5. As will be described elsewhere, this split groove 8 becomes effective for fixing the cutting insert holders 6 to the holder main frame 3 by pushing the holder main frame 3 in the direction of width after the positions of the cutting insert 7 are adjusted. A screw 9 for preparatory pushing is fitted to the center of the holder main frame 3 in the direction of width, and an escape groove 10 is defined at the internal end portion of the cutting insert holder 6 that interferes with this screw 9. This screw 9 eliminates the gap between the cutting insert holder fitting hole 5 and the cutting insert holder 6 due to their machining error or the like and makes it possible to perform position adjustment of the cutting insert 7 with a high level of accuracy.

On the other hand, there is provided position adjusting means for each cutting insert holder 6. The means is employed for locating the cutting insert 7 by independently moving each cutting insert holder 6 in the radial direction of the arbor 1, and consists of an adjusting screw 11 disposed rotatably inside the holder main frame 3 in parallel to the cutting insert holder 6 and a female screw 12 fixed to the cutting insert holder 6, extending in the radial direction of this cutting insert holder 6 and mating with the abovementioned adjusting screw 11.

More specifically, the adjusting screw 11 has a calibrated collar 13 at its head and a thrust collar 14 at its intermediate portion, the thrust collar 14 having a diameter greater than that of the drum of the adjusting screw. Plural steel balls 15 are disposed on both end portions of the thrust collar 14, respectively. The steel balls 15 are brought into contact with both end surfaces of the thrust collar 14 of the adjusting screw 11 and with the drum of the adjusting screw 11 by means of a tapered surface 22 formed in the holder main frame 3 and of a tapered surface 23 of a nut-like fastening screw 16 screwed to the holder main frame 3 in order to eliminate shake of the adjusting screw 11 in both axial and radial directions.

Figure 4:
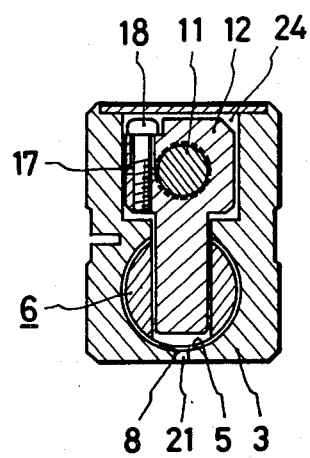
FIG. 4 is a sectional view taken along line IV—IV of FIG. 2.
Figure 5:
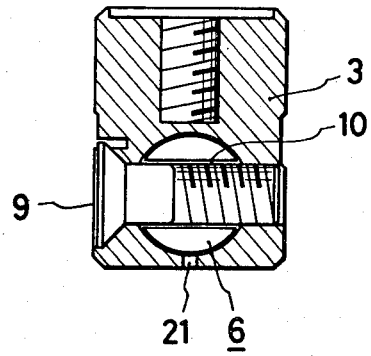
FIG. 5 is a sectional view taken along line V—V of FIG. 2.

At the mating portion of the female screw 12 with the adjusting screw 11, there is defined a split groove 17 which reaches the screw portion of the female screw 12 and is fastened by a screw 18, thereby eliminating backlash of the mating portion between the adjusting screw 11 and the female screw 12. Inside the holder main frame 3, there is provided a chamber 24 that has a sufficient space so as not to prevent movement of the female screw 12. An insertion hole 25 of a jig for rotating the adjusting screw 11 is bored at the head of the screw 11. Cutting insert holder fixing means, that is, means for integrating the cutting insert holders 6 with the arbor 1 after the positions of the cutting inserts 7 are determined by the aforementioned position adjusting means, consists of a groove 8 reaching the cutting insert holder fitting hole 5 of the holder main frame 3 and a set-screw 19 screwed to the holder main frame 3 in order to push the side surface of the holder main frame 3 as shown in FIG. 1. In pushing the side surface of the holder main frame 3 by means of this set-screw 19, it is preferred to form a slot 20 on the side surface of the holder main frame 3 on the pushing side as depicted in FIGS. 3 and 4 in order to strengthen the pressing force between the inner circumferential surface of the cutting insert holder fitting hole 5 and the outer circumferential surface of the cutting insert holder 6. It is also preferred to pack a filler 21 having elasticity such as an oil-resistant rubber or the like into the split groove 8 formed on the holder main frame 3 in order to prevent chips of the work and the like from entering the groove 8.

Although the foregoing description deals with the case in which two cutting insert holders 6 are employed by way of example, three or more cutting insert holder 6 may also be disposed. In such a case, the holder main frame itself is fabricated in a disclike shape and the cutting insert holders are equidistantly disposed around the circumferential surface of the holder main frame.

Next, the operation of the tool head of the present invention will be described. First, the set-screw 19 is loosened and the adjusting screw 11 is rotated by a desired angle while checking the calibrated collar 13 for each cutting insert holder. Upon rotation of this adjusting screw 11, the female screw 12 moves in the radical direction of the arbor 1 together with its cutting insert holder 6. As described already, since back-lash is eliminated by fastening the slot 17 using the screw 18, there occurs no shake of the female screw 12 with respect to the adjusting screw 11. The thrust collar 14 of the adjusting screw 11 is supported by the steel balls 15 coming into pressure contact with the tapered surface 23 of the fastening screw 16 and by the steel balls 15 coming likewise into pressure contact with the tapered surface 22 of the holder main frame 3, and its shake in both axial and radial directions is eliminated. Accordingly, there occurs no deviation of the position of the adjusting screw 11 in the axial direction. Moreover, the screw 9 for preparatory pushing eliminates beforehand the shake between the cutting insert holder fitting hole 5 and the chip holder 6 in the radial direction so that the position of each cutting insert 7 can be determined exactly proportionally to the angle of rotation of the adjusting screw 11.

As the position of each cutting insert 7 is individually adjusted, it is accurately located as a desired position. Next, when the set-screw 19 is fastened, the holder main frame 3 deflects in such a direction as to diminish the inner diameter of the cutting insert holder fitting hole 5 due to the presence of the split groove 8, and fixes the cutting insert holders 6 by fastening their outer circumference. Consequently, the cutting insert holders 6 are fixed integrally to the arbor 1 via the holder main frame 3.

Thus, the position adjustment of the cutting insert 7 of the tool is completed. When the workpiece is machined using the tool, each cutting insert 7 is arranged on the same pitch circle while keeping the balance. Since cutting vibration can be reduced in this manner, it becomes possible to accurately machine the workpiece into a finished surface having appreciable appearance. Furthermore, since the cutting insert holders 6 are fixed to the arbor 1, the tool head can withstand heavy cutting work.

As described in the foregoing, the present invention employs such a construction in which plural cutting insert holders are disposed radially on the holder main frame fixed to the arbor so that each is capable of sliding, each adjusting screw is disposed on the holder main frame in parallel to each cutting insert holder in such a manner as to restrict its movement in both axial and radial directions and the cutting insert holders are fixed while they are brought into tight screw engagement with the adjusting screws. According to this arrangement, therefore, each cutting insert holder can be located at a desired position in an easy and accurate manner.

In the present invention, the screw for preparatory pushing is disposed in such a manner as to transversely cross the cutting insert holder fitting hole and to fasten in advance each cutting insert holder. Accordingly, each cutting insert holder is free from shake and the position adjustment of the cutting insert holder becomes more accurate. Since the cutting insert holders are fixed by means of the set-screw, the tool head of the invention can sufficiently withstand heavy cutting work.

What is claimed is:

1. A tool head comprising:
an arbor having a groove defined on an end surface thereof;
a holder main frame fixed into said groove of said arbor, said main frame having a cylindrical hole bored therethrough in a longitudinal direction and plural chambers adjacent thereto;
plural cutting insert holders radially, slideably fitted in said cylindrical hole;
plural female screws each fitted to one of said holders and extending into one of said chambers; and
means for radially adjusting the position of each of said holders, each said means for adjusting comprising:
a tapered surface at a bottom of a stepped-open bore in said main frame which extends into one of said chambers, said stepped bore having an axis parallel to said cylindrical hole;
an adjusting screw positioned in said stepped bore and extending into said one of said chambers, said adjusting screw tightly threadingly engaging the female screw which extends into said one of said chambers, said adjusting screw having a drum portion with a diameter and a thrust collar with a diameter larger than that of said drum portion, said thrust collar being positioned on said drum portion adjacent said tapered surface of said stepped bore;
a fastening screw threadingly received in a portion of said stepped bore opposing said tapered surface; said fastening screw having a tapered bottom surface facing said thrust collar, said drum portion of said adjusting screw being freely received in a center portion of said fastening screw; and a plurality of steel balls interposed between said thrust collar and said tapered surface of said main frame, and between said thrust collar and said tapered bottom surface of said fastening screw, whereby shake in both the axial and radial directions of the adjusting screw is eliminated.

2. The tool head of claim 1, further comprising means for eliminating back-lash between said adjusting screw and said female screw which includes each said female screw having a slot therein formed to reach a screw portion thereof and a tightening screw threadingly fitted to said female screw to transversely cross said slot.

3. The tool head as defined in claim 1 wherein a split groove reaching said cylindrical hole is formed on the end surface of said holder main frame.

4. The tool head as defined in claim 1 wherein a screw for preparatory pushing is fitted to said holder main frame so as to transversely cross said cylindrical hole.

* * * * *